(12) United States Patent
Nishida et al.

(10) Patent No.: US 7,731,624 B2
(45) Date of Patent: Jun. 8, 2010

(54) AUTOMATIC TRANSMISSION

(75) Inventors: Masaaki Nishida, Anjo (JP); Hiroshi Katou, Anjo (JP); Masashi Kitou, Anjo (JP); Yuichi Seki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 337 days.

(21) Appl. No.: 12/071,569

(22) Filed: Feb. 22, 2008

(65) Prior Publication Data
US 2008/0207386 A1 Aug. 28, 2008

(30) Foreign Application Priority Data

Feb. 23, 2007 (JP) ............... 2007-043279
Jul. 5, 2007 (JP) ............... 2007-177826

(51) Int. Cl.
F16H 3/62 (2006.01)
F16D 47/04 (2006.01)

(52) U.S. Cl. ................. 475/275; 192/48.619
(58) Field of Classification Search ........... 475/146, 475/275
See application file for complete search history.

(56) References Cited

U.S. PATENT DOCUMENTS

| | | | | |
|---|---|---|---|---|
| 4,732,253 A * | 3/1988 | Hiramatsu et al. | ..... | 192/48.618 |
| 5,887,690 A * | 3/1999 | Haupt | ..... | 192/48.611 |
| 6,454,074 B1 * | 9/2002 | Kundermann et al. | .. | 192/48.618 |
| 7,001,298 B2 * | 2/2006 | Biermann et al. | ..... | 475/116 |
| 7,416,069 B2 * | 8/2008 | Tiesler | ..... | 192/48.611 |
| 2007/0060438 A1 | 3/2007 | Fukuyama et al. | | |
| 2007/0184932 A1 | 8/2007 | Tabata et al. | | |
| 2008/0202884 A1 * | 8/2008 | Nishida et al. | ..... | 192/106 F |
| 2008/0207384 A1 * | 8/2008 | Nishida et al. | ..... | 475/276 |
| 2008/0207386 A1 * | 8/2008 | Nishida et al. | ..... | 475/276 |
| 2008/0220928 A1 * | 9/2008 | Nishida et al. | ..... | 475/275 |
| 2009/0017954 A1 * | 1/2009 | Nishida et al. | ..... | 475/159 |
| 2009/0029820 A1 * | 1/2009 | Nishida et al. | ..... | 475/159 |

FOREIGN PATENT DOCUMENTS

| | | |
|---|---|---|
| JP | A 06-101724 | 4/1994 |
| JP | A-07-269665 | 10/1995 |
| JP | A 2004-353789 | 12/2004 |
| JP | A-2006-342845 | 12/2006 |
| JP | A-2007-032624 | 2/2007 |
| WO | WO 2005/026579 A1 | 3/2005 |

* cited by examiner

*Primary Examiner*—Dirk Wright
(74) *Attorney, Agent, or Firm*—Oliff & Berridge, PLC

(57) ABSTRACT

An automatic transmission that includes two clutches that are disposed at positions that overlap in an axial direction and are different in a radial direction. The two clutches each include: a clutch drum, a piston that structures a working oil chamber with a portion of the clutch drum used as a cylinder, a plurality of friction plates that engage the clutch drum, and a cancel oil chamber that is disposed on a back surface side of the piston and that cancels a centrifugal hydraulic pressure that acts on the working oil chamber. An inner spline is formed on the clutch drum of one clutch, among the two clutches, that is positioned on an outer diameter side. An outer spline is formed on the clutch drum of the other clutch, among the two clutches, that is positioned on an inner diameter side.

6 Claims, 3 Drawing Sheets

F I G. 1
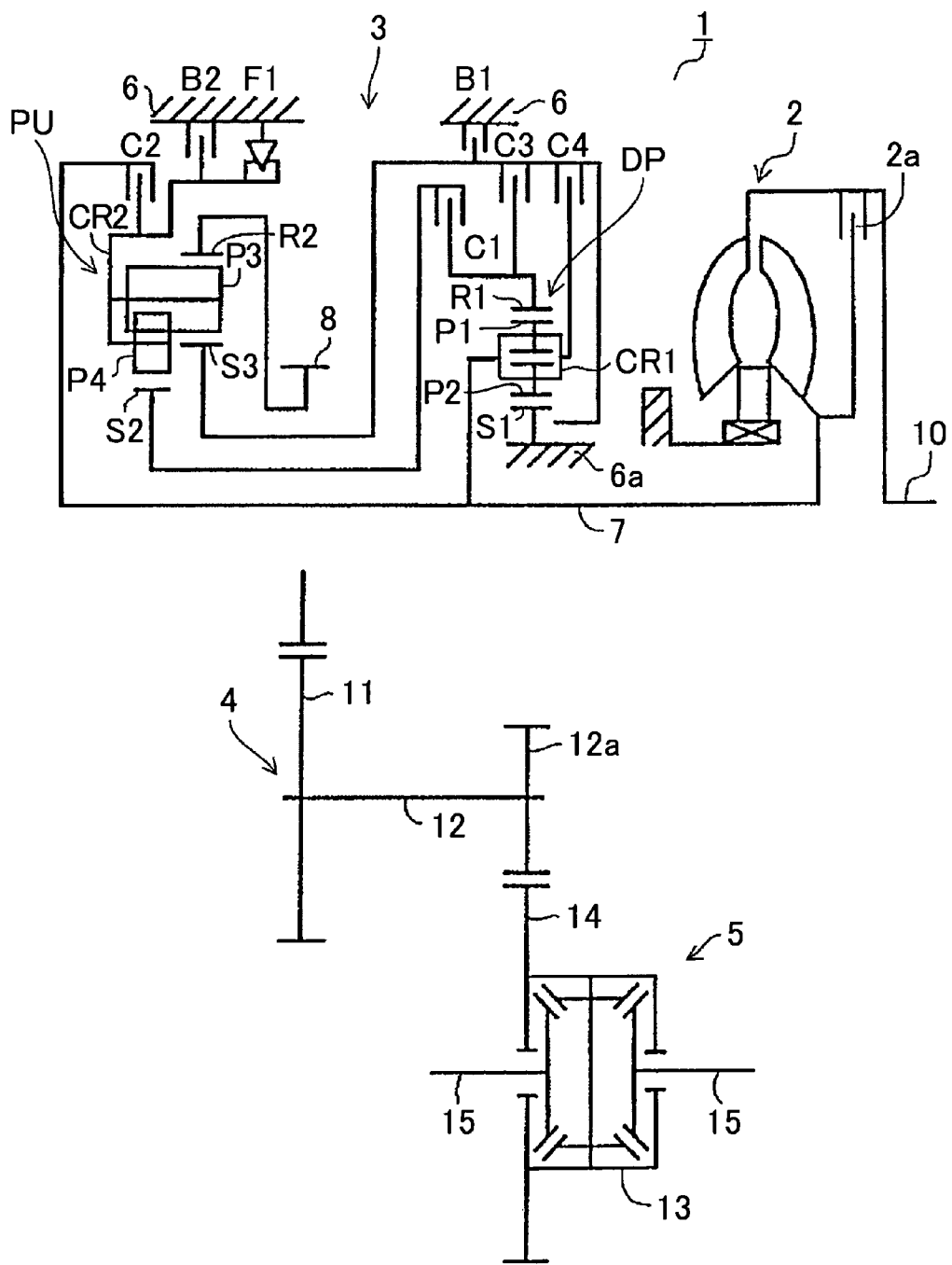

FIG.2

|      | C1 | C2 | C3 | C4 | B1 | B2  | F1 |
|------|----|----|----|----|----|-----|----|
| 1st  | ●  |    |    |    |    | (●) | ●  |
| 2nd  | ●  |    |    |    | ●  |     |    |
| 3rd  | ●  |    | ●  |    |    |     |    |
| 4th  | ●  |    |    | ●  |    |     |    |
| 5th  | ●  | ●  |    |    |    |     |    |
| 6th  |    | ●  |    | ●  |    |     |    |
| 7th  |    | ●  | ●  |    |    |     |    |
| 8th  |    | ●  |    |    | ●  |     |    |
| Rev1 |    |    | ●  |    |    | ●   |    |
| Rev2 |    |    |    | ●  |    | ●   |    |

(●) DENOTES BEING CARRIED OUT DURING ENGINE BRAKING

AUTOMATIC TRANSMISSION

INCORPORATION BY REFERENCE

The disclosure of Japanese Patent Application No. 2007-177826 filed on Jul. 5, 2007, and Japanese Patent Application No. 2007-043279 filed on Feb. 23, 2007, including the specifications, drawings and abstracts are incorporated herein by reference in their entirety.

BACKGROUND

The present invention relates to automatic transmissions.

In recent years, multiple speeds, for example, eight forward speeds, have been realized in automatic transmissions that are mounted in vehicles. At the same time, from the point of view of vehicle mounting characteristics, disposing many structural components, for example, clutches, compactly is required.

Conventionally, an automatic transmission has been proposed in which, for two clutches having one input member that is shared and the other that is different, one clutch that is disposed on the inner diameter side is fit in the clutch drum of the other clutch that is disposed on the outer diameter side, and the two clutches are aligned in parallel in the axial direction. A reduction in the size is thus realized in the axial direction (see, for example, Japanese Patent Application, JP-A-2006-342845).

The clutch drum of the one clutch that is disposed on the outer diameter side and the clutch drum of the other clutch that is disposed on the inner diameter side are spline engaged together in a rotational direction at a cylindrical boss portion that is formed at the inner diameter side thereof. The outer spline is formed on the outer circumference of the boss portion of the one clutch, and the inner spline is formed on the inner periphery of the boss portion of the other clutch.

In addition, the working oil chamber and a cancel oil chamber of the other clutch are provided on the boss portion of the one clutch on which the spline is formed, the hydraulic pressure (or oil) is supplied via oil holes that are provided in the boss portion of the other clutch, and the working oil chamber and the cancel oil chamber of the other clutch on the outer diameter side is structured by changing the position on the back side of the other clutch in the radial direction.

SUMMARY

In the automatic transmission that is disclosed in Japanese Patent Application, JP-A-2006-342845, the spline engagement portion of the clutch drum on the other clutch that is disposed on the inner diameter side and the clutch drum of the one clutch that is disposed on the outer diameter side are formed on the boss portion that is disposed on the inner diameter side of both clutches. Thus, the working oil chamber and the cancel oil chamber of the other clutch on the inner diameter side is disposed above the spline engagement portion, and the radial direction is reduced. This structure invites a reduction in the pressure receiving area of the piston. Thereby, in the other clutch on the inner diameter side, the number of friction plates is increased in order to attain a sufficient torque volume. This prevents a reduction in the size of the automatic transmission in the axial direction.

Thus, the present invention provides an automatic transmission that solves the problems described above by forming an inner spline on the clutch drum of the clutch that is positioned on the outer diameter side and by forming an outer spline on the clutch drum of the clutch that is positioned on the inner diameter side. The present invention can also achieve various other advantages.

The invention according to a first aspect is an automatic transmission that includes two clutches that are disposed at positions that overlap in an axial direction and are different in a radial direction. The two clutches each include: a clutch drum, a piston that structures a working oil chamber with a portion of the clutch drum used as a cylinder, a plurality of friction plates that engage the clutch drum, and a cancel oil chamber that is disposed on a back surface side of the piston and that cancels a centrifugal hydraulic pressure that acts on the working oil chamber. An inner spline is formed on the clutch drum of one clutch, among the two clutches, that is positioned on an outer diameter side. An outer spline is formed on the clutch drum of the other clutch, among the two clutches, that is positioned on an inner diameter side. The inner spline and the outer spline are engaged; and the clutch drums of the two clutches are integrally linked in the rotational direction and in the axial direction.

BRIEF DESCRIPTION OF THE DRAWINGS

Various exemplary aspects of the invention will be described with reference to the drawings, wherein:

FIG. 1 is a skeleton drawing that schematically shows the present automatic transmission;

FIG. 2 is an engagement diagram of the present automatic transmission; and

DETAILED DESCRIPTION OF EMBODIMENTS

Figure 3:
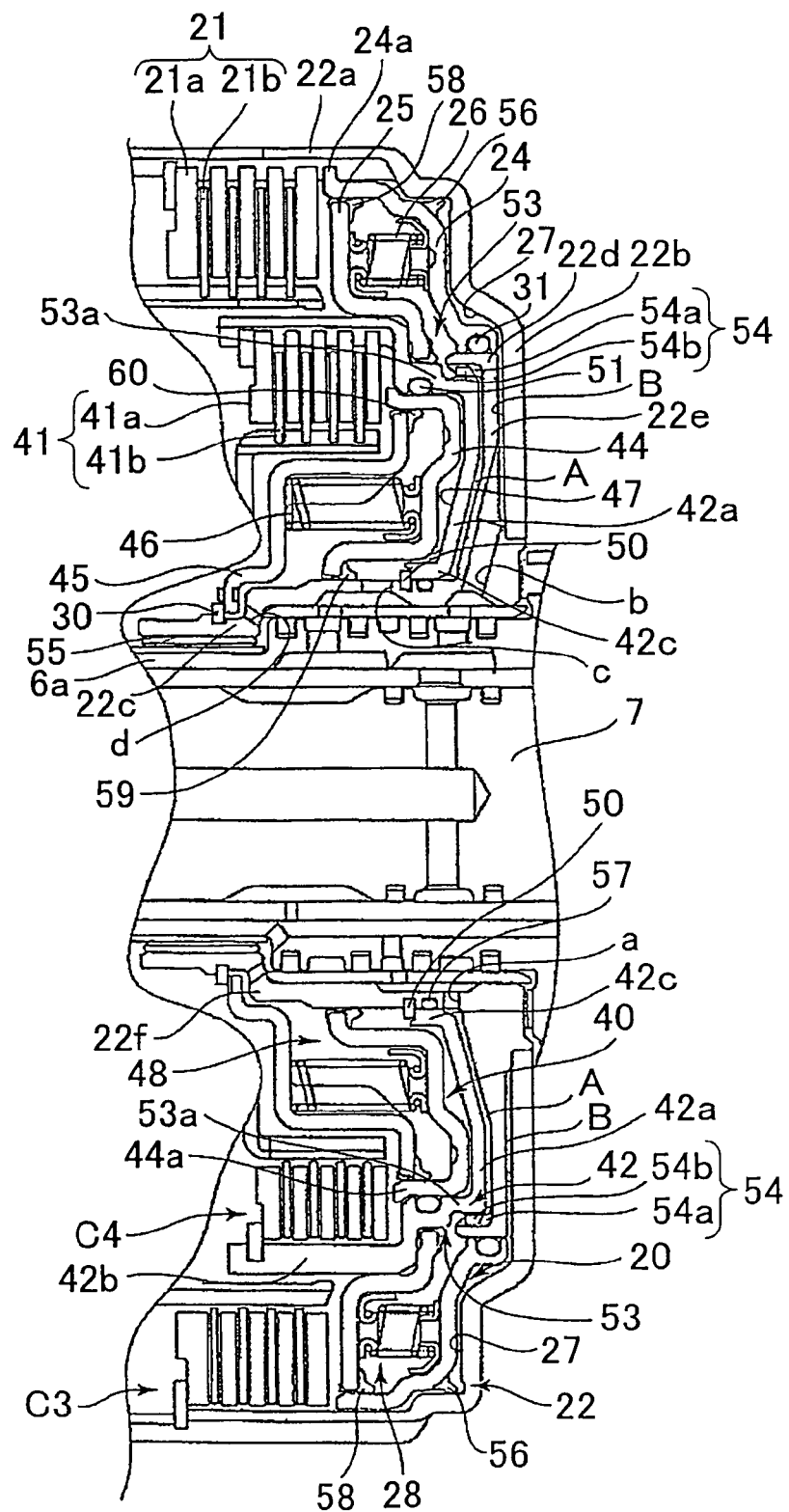
FIG. 3 is an enlarged cross-sectional drawing that shows a portion of the present automatic transmission.

Below, the embodiment of the invention will be explained with reference to FIG. 1 to FIG. 3.

The automatic transmission according to the present invention is an advantageous automatic transmission that is mounted, for example, in an FF (front engine, front drive) vehicle, and the left to right directions in FIG. 1 and FIG. 3 correspond to the front-to-back direction of a drive power transfer path (a drive source side and a wheel side are referred to as a front side and a back side, respectively). However, for the convenience of explanation, the right side in the figure, which is the drive source side of an engine or the like may be referred to as the "front side," and the left side in the figure may be referred to as the "back side."

First, a schematic structure of an exemplary automatic transmission 1 will be explained with reference to FIG. 1. As shown in FIG. 1, the FF type automatic transmission 1 is provided with a case 6 such as a housing case and a transmission case, and on the front side of the case (specifically, the converter housing) 6, there is an input member (a front cover and a center piece) 10 that can be connected to an engine (not illustrated). In addition, a torque converter 2 that has a lock-up clutch 2a is disposed in this automatic transmission 1, and a speed change mechanism 3, a counter shaft portion 4, and a differential portion 5 are disposed in the transmission case.

The torque converter 2 is disposed on an axis that is centered on the input shaft 7 of the speed change mechanism 3, which is coaxial to the output shaft of the engine (not illustrated). In addition, the counter shaft portion 4 is disposed on the counter shaft 12, which is on an axis parallel to the input shaft 7, and the differential portion 5 is disposed so as to have left and right axles 15 on an axis that is parallel to the counter shaft 12.

In the speed change mechanism 3, planetary gear (speed reducing planetary gear) DP is provided on the input shaft 7, and a planetary gear unit (planetary gear set) PU is provided at the back side thereof.

As shown in FIG. 1, the planetary gear DP is what is referred to as a double pinion planetary gear, and is provided with a first sun gear S1, a first carrier CR1, and a first ring gear R1, and has a configuration in which a pinion P2 meshes with the first sun gear S1 and a pinion P1 meshes with the first ring gear R1, and further, the pinion P2 and the pinion P1 both mesh with the first carrier CR1.

At the same time, the planetary gear unit PU is a Ravigneaux planetary gear that has four rotational elements, that is, a second sun gear S2, a third sun gear S3, a second carrier CR2, and a second ring gear R2, and has a configuration in which a long pinion P3 meshes with the third sun gear S3 and the second ring gear R2 and a short pinion P4 meshes with the second sun gear S2, and further, the long pinion P3 and the short pinion P4 both mesh with the second carrier CR2.

The rotation of the first sun gear S1 of the planetary gear DP is held stationary with respect to the case 6. In addition, the carrier CR1 is connected to the input shaft 7 and rotates along with the rotation (hereinafter, referred to as the "input rotation") of the input shaft 7, and is connected to the fourth clutch C4. Furthermore, the first ring gear R1 rotates at a reduced speed, where the speed of the input rotation has been reduced due to the stationary first sun gear S1 and the first carrier CR1, which provides the input rotation. In addition, the first ring gear R1 is connected to the first clutch C1 and the third clutch C3.

The third sun gear S3 of the planetary gear unit PU is connected to the first brake B1 and can be held stationary with respect to the case 6. The third sun gear S3 is also connected to the fourth clutch C4 and the third clutch C3, the input rotation of the first carrier CR1 can be freely input thereto via the fourth clutch C4 and the reduced speed rotation of the first ring gear R1 can be freely input thereto via the third clutch C3. In addition, the second sun gear S2 is connected to the first clutch C1, and the reduced speed rotation of the first ring gear R1 described above can be freely input thereto.

Furthermore, the second carrier CR2 is connected to the second clutch C2, to which the rotation of the input shaft 7 is input, and the input rotation can be freely input via the second clutch C2. In addition, the second carrier CR2 is connected to a one-way clutch F1 and the second brake B2, the one-directional rotation of the second carrier CR2 is restricted with respect to the case (specifically, the transmission case) 6 by the one-way clutch F1, and the rotation can be freely held stationary via the second brake B2. In addition, the second ring gear R2 is connected to the counter gear 8 that is supported rotatably with respect to the center support member that is held stationary by the transmission case.

In addition, the large-diameter gear 11 that is held stationary on the countershaft 12 of the countershaft portion 4 meshes with the counter gear 8, and the gear 14 of the differential portion 5 meshes with the countershaft 12 via the small-diameter gear 12a that is formed on the outer circumferential surface. In addition, the gear 14 is held stationary by the differential gear 13, and is connected to the left and right axles 15, 15 via the differential gear 13.

Next, the operation of the speed change mechanism 3 based on the structure described above will be explained with reference to FIG. 1 and FIG. 2.

In the D (drive) range, for example, as shown in FIG. 2, in the first forward gear (1st), the first clutch C1 and the one-way clutch F1 are engaged. Thus, the rotation of the first ring gear R1 is input to the second sun gear S2 via the first clutch C1, where the first ring gear rotates at a reduced speed due to the stationary first sun gear S1 and the first carrier CR1, which provides input rotation. In addition, the rotation of the second carrier CR2 is restricted to one direction (the positive rotational direction), that is, the negative rotation of the second carrier CR2 is prevented and it is held stationary. Thereby, the reduced speed rotation that is input into the second sun gear S2 is output to the second ring gear R2 via the stationary second carrier CR2, and the positive rotation, which serves as the first forward gear, is output from the counter gear 8.

Note that during engine braking (i.e., during coasting), the state of the first forward speed is maintained by locking the second brake B2, holding the second carrier CR2 stationary, and preventing the positive rotation of the second carrier CR2. In addition, in the first forward speed, the negative rotation of the second carrier CR2 is prevented by the one-way clutch F1 and positive rotation is possible. As a result, the establishment of the first forward speed, for example, during the switching from a non-travel range to a travel range, can be carried out smoothly by the automatic engagement of the one-way clutch F1.

In the second forward speed (2nd), the first clutch C1 is engaged and the first brake B1 is locked. Thereby, the rotation of the first ring gear R1 is input to the second sun gear S2 via the first clutch C1, where the first ring gear R1 rotates at a reduced speed due to the stationary first sun gear S1 and the first carrier CR1, which provides the input rotation. In addition, the rotation of the third sun gear S3 is held stationary due to the locking of the first brake B1. Thereby, the second carrier CR2 rotates at a reduced speed that is lower than a rotation speed of the second sun gear S2, the reduced speed rotation that has been input to the second sun gear S2 is output to the second ring gear R2 via the second carrier CR2, and the positive rotation is output from the counter gear 8 as the second forward speed.

In the third forward speed (3rd), the first clutch C1 and the third clutch C3 are engaged. Thereby, the rotation of the first ring gear R1 is input to the second sun gear S2 via the first clutch C1, where the first ring gear R1 rotates at a reduced speed due to the stationary first sun gear S1 and the first carrier CR1, which provides the input rotation. In addition, the reduced speed rotation of the first ring gear R1, which has been reduced due to the engagement of the third clutch C3, is input to the third sun gear S3. That is, because the reduced speed rotation of the first ring gear R1 is input to the third sun gear S3 and the second sun gear S2, the planetary gear unit PU becomes directly linked to the reduced speed rotation, the reduced speed rotation is directly output to the second ring gear R2, and the positive rotation, which serves as the third forward speed, is output from the counter gear 8.

In the fourth forward speed (4th), the first clutch C1 and the fourth clutch C4 are engaged. Thereby, the rotation of the first ring gear R1 is input to the second sun gear S2 via the first clutch C1, where the first ring gear R1 rotates at a reduced speed due to the stationary first sun gear S1 and the first carrier CR1, which provides the input rotation. In addition, the input rotation of the first carrier CR1 is input to the third sun gear S3 due to the engagement of the fourth clutch C4. Thereby, the second carrier CR2 rotates at a reduced speed that is higher than a rotation speed of the second sun gear S2, the reduced speed rotation that has been input to the second sun gear S2 is output to the second ring gear R2 via the second carrier CR2, and the positive rotation, which serves as the fourth forward speed, is output from the counter gear 8.

In the fifth forward speed (5th), the first clutch C1 and the second clutch C2 are engaged. Thereby, the rotation of the first ring gear R1 is input to the second sun gear S2 via the first clutch C1, where the first ring gear R1 rotates at a reduced speed due to the stationary first sun gear S1 and the first carrier CR1, which provides the input rotation. In addition, the input rotation is input to the second carrier CR2 due to the engagement of the second clutch C2. Thereby, due to the reduced speed rotation that has been input to the second sun gear S2 and the input rotation that has been input to the second carrier CR2, a reduced rotation that is higher than the fourth forward speed is output to second ring gear R2, and the positive rotation, which serves as the fifth forward speed, is output from the counter gear 8.

In the sixth forward speed (6th), the second clutch C2 and the fourth clutch C4 are engaged. Thereby, the input rotation of the first carrier CR1 is input to the third sun gear S3 due to the engagement of the fourth clutch C4. In addition, this input rotation is input to the second carrier CR2 due to the engagement of the second clutch C2. That is, because the input rotation is input to the third sun gear S3 and the second carrier CR2, the planetary gear unit PU becomes directly linked to the input rotation, the input rotation is directly output to the second ring gear R2, and the positive rotation, which serves as the sixth forward speed, is output from the counter gear 8.

In the seventh forward speed (7th), the second clutch C2 and the third clutch C3 are engaged. Thereby, the rotation of the first ring gear R1 is input to the third sun gear S3 via the third clutch C3, where the first ring gear R1 rotates at a reduced speed due to the stationary first sun gear S1 and the first carrier CR1, which provides the input rotation. In addition, the input rotation is input to the second carrier CR2 due to the engagement of the second clutch C2. Thereby, due to the reduced speed rotation that is input to the third sun gear S3 and the input rotation that is input to the second carrier CR2, a reduced speed rotation that is slightly higher than the input rotation is output to the second ring gear R2, and the positive rotation, which serves as the seventh forward speed, is output from the counter gear 8.

In the eighth forward speed (8th), the second clutch C2 is engaged and the first brake B1 is locked. Thereby, the input rotation is input to the second carrier CR2 due to the engagement of the second clutch C2. In addition, the rotation of the third sun gear S3 is held stationary due to the locking of the first brake B1. Thereby, the input rotation of the second carrier CR2 becomes an increased speed rotation that is higher than that of the seventh forward speed due to the stationary third sun gear S3, this input rotation is output to the second ring gear R2, and the positive rotation, which serves as the eighth forward speed, is output from the counter gear 8.

In the first reverse speed (Rev 1), the third clutch C3 is engaged and the second brake B2 is locked. Thereby, the rotation of the first ring gear R1 is input to the third sun gear S3 via the third clutch C3, where the first ring gear R1 rotates at a reduced speed due to the stationary first sun gear S1 and the first carrier CR1, which provides the input rotation. In addition, the rotation of the second carrier CR2 is held stationary due to the engagement of the second brake B2. Thereby, the reduced speed rotation that has been input to the third sun gear S3 is output to the second ring gear R2 via the stationary second carrier CR2, and the negative rotation, which serves as the first reverse speed, is output from the counter gear 8.

In the second reverse speed, the fourth clutch C4 is engaged and the second brake B2 is locked. Thereby, the input rotation of the first carrier CR1 is input to the third sun gear S3 due to the engagement of the fourth clutch C4. In addition, the rotation of the second carrier CR2 is held stationary due to the locking of the second brake B2. Thereby, the input rotation that has been input to the third sun gear S3 is output to the second ring gear R2 via the stationary second carrier CR2, and the reverse rotation, which serves as the second reverse speed, is output from the counter gear 8.

Note that, for example, in the P (parking) range and the N (neutral range), the first clutch C1, the second clutch C2, the third clutch C3, and the fourth clutch C4 are released. Thereby, the first carrier CR1 and the third sun gear S3, the first ring gear R1, and the third sun gear S3 and the second sun gear S2 are disengaged, that is, the planetary gear DP and the planetary gear unit PU are disengaged. In addition, the input shaft 7 and the second carrier CR2 are disengaged. Thus, the drive power transfer between the input shaft 7 and the planetary gear unit PU is disengaged. Thereby, the drive power transfer between the input shaft 7 and the planetary gear unit PU is disconnected, that is, the drive power between the input shaft 7 and the counter gear 8 is disconnected.

Next, in the automatic transmission 1, the structure of the third (the one) clutch C3 and the fourth (the other) clutch C4 according to the present invention will be explained with reference to FIG. 3. The fourth clutch C4, which is positioned on the inner diameter side, is disposed in two levels so as to be enclosed by the third clutch C3. Specifically, the third clutch C3 is disposed at a position that is on the outer diameter side of the fourth clutch C4, overlaps the fourth clutch C4 in the axial direction, and is different from the fourth clutch C4 in the radial direction.

The hydraulic servo 20 of the third clutch C3 described above includes a clutch drum 22, a piston member 24, a cancel plate 25, and a return spring 26. Thereby, the working oil chamber 27 is formed and the cancel oil chamber 28 is formed on the back face thereof. The clutch drum 22 is integrally formed, for example, by welding, by an inner circumferential side member that forms the boss portion 22c, and the piston supporting portion 22e and an outer circumferential side member that forms the drum portion 22a and the bottom portion 22b. The outer circumferential side of the drum portion 22a is extended up to the back of the first clutch C1 (not illustrated), and the boss portion 22c is rotatably supported by the stator shaft (stationary member) 6a via the bush 55. This boss portion 22c and the drum portion 22a are linked by the bottom portion 22b. Note that the converter housing and the transmission case are integrally connected and designated as the case 6. In addition, the case and the members integrated with the case are stationary members, which include the case, an oil pump cover and its case, the stator shaft 6a and the like. Therefore, the first sun gear S1 and the boss portion 22c of the clutch drum 22 may be held stationary and rotatably supported by any stationary members such as the case or the stationary members integrated with the case as well as the stator shaft 6a, respectively.

A flange portion 22d is formed on the outer circumference of the piston supporting portion 22e, which extends from the boss portion 22c to the outer diameter side, at the middle portion of the bottom portion 22b of the clutch drum 22. This flange portion 22d extends a considerably shorter distance than the drum portion 22a and the boss portion 22c and in the same direction as the drum portion 22a and the boss portion 22c. In addition, the flange portion 22d is linked via the O-ring 31 to the piston member 24 on the outer circumferential surface so as to be oil-tight, and an inner spline 54a is formed on the inner circumferential surface thereof. The flange portion 22d is spline engaged with the outer spline 54b that is formed on the cylindrical portion 53a of the clutch drum 42 of the fourth clutch C4, which will be described below.

The piston member 24 is fitted into the flange portion 22d so as to move freely in the axial direction and the outer circumferential surface thereof is linked to the inner circumferential surface of the clutch drum 22 via the seal member 56 so as to be oil-tight. The working oil chamber 27 is formed by the piston member 24 and the inner circumferential surface of the clutch drum 22 that forms a cylinder. In addition, the piston member 24 is provided with an extended portion 24a that extends towards the rear, and the disengagement of the third clutch C3 is carried out by the extended portion 24a pressing the friction plate 21.

In contrast, the clutch drum 42 of the fourth clutch C4 is provided such that the position thereof in the axial direction is restricted by the snap link 50 on the boss portion 22c of the third clutch C3 and so as to be oil-tight via the O-ring 57. The clutch drum 42 includes the flange portion 42a that extends from the inner diameter side portion 42c thereof towards the outer diameter side and a drum portion 42b with which the plurality of outer friction plates 41a is spline engaged, and an L-shaped step portion 53 is provided at the outer diameter side of the flange portion 42a.

An outer spline 54b is formed on the outer circumference of the cylindrical portion 53a that is provided parallel to the axis of the step portions 53, and the outer spline 54b is spline engaged with the inner spline 54a that is formed on the inner circumference of the flange portion 22d of the clutch drum 22 of the third clutch C3 described above. In addition, on the inner circumferential side of the cylindrical portion 53a, a piston 44 is provided, and the inner circumferential surface of the cylindrical portion 53a and the piston 44 are formed so as to be oil-tight by the O-ring 51. This cylindrical portion 53a forms a portion of the cylinder of the working oil chamber 47 of the fourth clutch C4, and the piston 44 is stroked within the range of the cylindrical portion 53a.

This piston 44 is provided so as to overlap in the axial direction at the inner diameter side of the piston 24 of the third clutch C3, and at the same time, the piston 44 partially overlaps the stroke range of the piston 24 of the third clutch C3. Here, the third clutch C3 is linked to the outer circumferential surface of the flange portion 22d that is provided with an inner spline 54a that spline engages with the outer spline 54b, which is provided on the cylindrical portion 53a.

The cancel plate 25 of the third clutch C3 abuts against the step portion 53 that is provided on the clutch drum 42 of the fourth clutch C4 so as to be restricted to the rearward movement in the axial direction, and is provided on the outer circumference thereof so as to be oil-tight with the piston 24 via the seal member 58. The cancel oil chamber 28 is structured by the outer circumferential surface of this cancel plate 25 and the inner circumferential surface of the piston 24, and generates a hydraulic pressure that balances the centrifugal hydraulic pressure that has been generated in the working oil chamber 27 of the third clutch C3. In addition, a return spring 26 is disposed between this cancel plate 25 and the piston 24, and the return spring 26 constantly urges the piston 24 forward. Moreover, the return spring 26 uses a spring that has a stronger urging force than the return spring 46 that is provided in the cancel oil chamber 48 of the fourth clutch C4, which will be described below.

The oil from the oil holes b is supplied via a prescribed gap B that is provided between the piston supporting portion 22e of the clutch drum 22 and the bottom portion 22b of the clutch drum 22 in the working oil chamber 27 of the third clutch C3. This gap B has a cross-sectional oil passage area that is large in comparison to the oil through holes in a short (narrow) space in the axial direction due to being provided over the entire circumference so as to spread out in a planar shape.

In addition, a structure is used in which lubricating oil is supplied to the cancel oil chamber 28 of the third clutch C3 from oil holes a via a gap A that is provided between the clutch drum 42 of the fourth clutch C4 and the back surface of the piston supporting portion 22e of the third clutch C3. The gap A has a cross-sectional oil passage area that is large in comparison to the oil through holes in a short space in the axial direction due to being provided on the entire circumference so as to spread out in a planar shape. Moreover, the spline 54 provided between the clutch drum 42 of the fourth clutch C4 and the flange portion 22e of the third clutch C3 is structured so that teeth are absent therein, so as not to hinder the flow of oil in the oil paths described above.

In contrast, the hydraulic servo 40 of the fourth clutch C4 described above includes the clutch drum 42, the piston member 44, the cancel plate 45, and the return spring 46. Thereby, the working oil chamber 47 is formed, and the cancel oil chamber 48 is formed on the back face thereof.

The piston 44 is provided so as to be oil-tight via the seal member 59 and movable in the axial direction on the boss portion 22c of the clutch drum 22 of the third clutch C3, and is provided with an extended portion 44a that presses the friction plates 41. The outer circumferential surface of the extended portion 44a and the inner circumferential surface of the cylindrical portion 53a of the drum clutch 42 are fitted so as to be oil-tight via the O-ring 51, as explained above.

The working oil chamber 47 of the fourth clutch C4 is formed by the outer circumferential surface of the piston 44 and the inner circumferential surface of the clutch drum 42 that forms a cylinder, and structured such that oil is supplied by oil holes c to the working oil chamber 47.

In addition, the cancel plate 45 of the fourth clutch C4 is provided so as to be restricted to a position in the axial direction by the step portion 22f of the boss portion 22c of the third clutch drum 22 and the snap ring 30, and this cancel plate 45 fits the inner circumferential surface of the piston 44 via the seal member 60 so as to be oil-tight.

The cancel oil chamber 48, in which hydraulic pressure is generated that balances the centrifugal hydraulic pressure that is generated in the working oil chamber 47 of the fourth clutch C4, is structured by the outer circumferential surface of the cancel plate 45 and the inner circumferential surface of the piston 44. A return spring 46 is provided between the piston 44 and the cancel plate 45, and the piston 44 is constantly urged forward. In addition, lubricating oil is supplied by the oil holes d to this cancel oil chamber 48.

Next, the operation of the third clutch C3 and the fourth clutch C4 will be explained below.

The third clutch C3 moves the piston 24 in the axial direction due to the hydraulic pressure that is generated in the working oil chamber 27, and the third clutch C3 is disengaged due to pressing the friction plate 21. The working oil that is acted on by the hydraulic pressure that has been generated by an oil pump (not illustrated) is supplied to the working oil chamber 27 from the oil holes b that are formed in the clutch drum 22 through the gap B, which is provided over the entire circumference in a planar shape.

In addition, because the centrifugal hydraulic pressure acts in the working oil chamber 27, lubricating oil is supplied to the cancel oil chamber 28 which is opposite to the working oil chamber 27 with the piston 24 interposed therebetween, from the oil holes a via the gap A that is provided over the entire circumference in a planar shape, and thus the centrifugal hydraulic pressure is generated in the cancel oil chamber 28 and balances the centrifugal hydraulic pressure that has been generated in the working oil chamber 27.

Similar to the fourth clutch C4, working oil is supplied to the working oil chamber 47 from the oil holes c by an oil pump (not illustrated), the piston 44 is moved in the axial direction, and the fourth clutch C4 is disengaged by pressing the friction plate 41. The lubricating oil is supplied to the cancel oil chamber 48 from the oil holes d, the centrifugal hydraulic pressure is generated in the cancel oil chamber 48, and balanced by the centrifugal hydraulic pressure that has been generated in the working oil chamber 47.

As explained above, according to the automatic transmission 1 of the present invention, the clutch unit and the automatic transmission can be structured compactly in the axial direction by disposing the third clutch C3 at a position that is on the outer diameter side of the fourth clutch C4, overlaps the clutch C4 in the axial direction and is different in the radial direction.

In addition, an inner spline 54a is formed on the inner circumferential surface of the flange portion 22d of the clutch drum 22 of the third clutch C3, which is positioned on the outer diameter side, and an outer spline 54b is formed on the cylindrical portion 53a of the inner diameter side of the step portion 53 of the clutch drum 42 of the fourth clutch C4, which is positioned on the inner diameter side. The inner spline 54a and the outer spline 54b are spline engaged, and thus the piston 24 of the third clutch C3 and the piston 44 of the fourth clutch C4 are disposed at positions that are different in the radial direction, and by overlapping the stroke range of both pistons, it is possible to realize a downsizing of the clutch unit and the automatic transmission in the axial direction.

According to an exemplary aspect of the invention, by providing two clutches at positions that overlap in the axial direction and are different in the radial direction, it is possible to form the clutch unit and the automatic transmission compactly in the axial direction. At the same time, among the two clutches, an inner spline is formed in the clutch drum of the one clutch that is positioned on the outer diameter side, an outer spline is formed on the clutch drum of the other clutch that is positioned on the inner diameter side, the inner spline and the outer spline are engaged, and the clutch drums of the one and the other clutches are linked together in a rotational direction. It is thus possible to prevent insufficient torque volume in the clutches due to a reduction in the pressure receiving area of the piston of the other clutch. Thereby, it is possible to ensure sufficient torque volume of the clutch, and it is possible to realize a reduction in the size of the automatic transmission in the axial direction by structuring a clutch by the necessary minimum number of friction plates.

According to an exemplary aspect of the invention, the inner spline is formed on the inner circumferential surface of the fitting portion on the inner diameter side of the piston in the clutch drum of the one clutch and an outer spline is formed on the outer circumferential surface of the fitting portion on the outer diameter side of the piston in the clutch drum of the other clutch. It thus possible to structure the spline engaging portion that integrally links both clutch drums of the one and the other clutches compactly in the axial direction and the radial direction.

According to an exemplary aspect of the invention, the inner spline that is formed on the inner circumferential surface of the flange portion of the one clutch that is positioned on the outer diameter side and the outer spline that is formed on the outer circumferential surface of the cylindrical portion of the other clutch that is positioned on the inner diameter side are spline engaged, and the stroke range of the piston of the one clutch and the stroke range of the piston of the other clutch overlap at least partially. It is thus possible to realize a reduction in the size of the clutch unit in the axial direction.

According to an exemplary aspect of the invention, in an automatic transmission that establishes eight forward speeds and at least one reverse speed, it is possible to realize reductions in the size, and in particular, reductions in the size in the axial direction.

What is claimed is:

1. An automatic transmission comprising:
    two clutches that are disposed at positions that overlap in an axial direction and are different in a radial direction, wherein
    the two clutches each comprise:
        a clutch drum,
        a piston that structures a working oil chamber with a portion of the clutch drum used as a cylinder,
        a plurality of friction plates that engage the clutch drum, and
        a cancel oil chamber that is disposed on a back surface side of the piston and that cancels a centrifugal hydraulic pressure that acts on the working oil chamber, wherein:
    an inner spline is formed on the clutch drum of one clutch, among the two clutches, that is positioned on an outer diameter side;
    an outer spline is formed on the clutch drum of the other clutch, among the two clutches, that is positioned on an inner diameter side;
    the inner spline and the outer spline are engaged; and
    the clutch drums of the two clutches are integrally linked in the rotational direction and in the axial direction.

2. The automatic transmission according to claim 1, wherein:
    the inner spline is formed on an inner circumferential surface of a portion into which an inner diameter side of the piston in the clutch drum of the one clutch fits; and
    the outer spline is formed on an outer circumferential surface of a portion into which an outer diameter side of the piston in the clutch drum of the other clutch fits.

3. The automatic transmission according to claim 1, wherein:
    the clutch drum of the one clutch comprises:
        a boss portion that extends in the axial direction at the inner diameter side;
        a drum portion that extends in the axial direction at the outer diameter side;
        a bottom portion that links between the boss portion and the drum portion; and
        a flange portion that extends in a same direction as the boss portion and the drum portion in a middle of the bottom portion, and the inner diameter side of the piston fits into the flange portion and the inner spline is formed on an inner circumferential surface of the flange portion;
    the clutch drum of the other clutch comprises:
        a flange portion; and
        a drum portion that has a step portion on the outer diameter side of the flange portion, wherein the piston is disposed so as to fit into a cylindrical portion of the inner diameter side of the step portion of the drum portion and the boss portion of the one clutch so as to be oil-tight, and the outer spline is formed on the an circumferential surface of the cylindrical portion, wherein:
    an inner diameter side portion of the clutch drum of the other clutch is retained with a snap ring on the boss portion of the one clutch; and
    a stroke range of the piston of the one clutch and a stroke range of the piston of the other clutch overlap at least partially.

4. The automatic transmission according to claim 1 comprising:
- an input shaft at which an input rotation from a drive source is input;
- a speed reducing planetary gear that comprises:
  - a first sun gear whose rotation is held stationary with respect to a case and a stationary member that is integrated with the case,
  - a first carrier that is linked to the input shaft, and
  - a first ring gear that outputs a reduced speed rotation due to the first sun gear whose rotation is held stationary and the first carrier to which the input rotation is input; and
- a planetary gear set that comprises:
  - a second sun gear that inputs the reduced speed rotation of the first ring gear due to engagement of a first clutch;
  - a third sun gear that inputs the reduced speed rotation of the first ring gear due to engagement of a third clutch, inputs the rotation of the input shaft via the first carrier due to engagement of a fourth clutch, and whose rotation is held stationary due to locking of a first brake;
  - a second carrier that includes a long pinion that meshes with the third sun gear and a short pinion that meshes with the second sun gear, whose rotation is held stationary due to locking of the second brake, and that inputs the rotation of the input shaft due to the engagement of a second clutch, and
  - a second ring gear that meshes with the long pinion and is rotationally linked to the output member; wherein:
- the one clutch is the third clutch;
- the other clutch is the fourth clutch;
- a first forward speed is established by engaging the first clutch and locking the second brake;
- a second forward speed is established by engaging the first clutch and locking the first brake;
- a third forward speed is established by engaging the first clutch and the third clutch;
- a fourth forward speed is established by engaging the first clutch and the fourth clutch;
- a fifth forward speed is established by engaging the first clutch and the second clutch;
- a sixth forward speed is established by engaging the second clutch and the fourth clutch;
- a seventh forward speed is established by engaging the second clutch and the third clutch;
- an eighth forward speed is established by engaging the second clutch and locking the first brake; and
- a reverse speed is established by engaging the third clutch or the fourth clutch and locking the second brake.

5. The automatic transmission according to claim 2, wherein:
- the portion onto which the inner spline is formed is a flange portion of the clutch drum that is fitted to the piston of the one clutch on an outer circumferential surface, and
- the portion onto which the outer spline is formed is a cylindrical portion that is parallel to an axis of a step portion of the clutch drum of the other clutch.

6. The automatic transmission according to claim 5, wherein the cylindrical portion forms a part of a working oil chamber for the other clutch.

* * * * *